United States Patent
Venkatasubramanian et al.

(10) Patent No.: US 8,433,673 B2
(45) Date of Patent: Apr. 30, 2013

(54) SYSTEM AND METHOD FOR SUPPORTING DATA WAREHOUSE METADATA EXTENSION USING AN EXTENDER

(75) Inventors: Raghuram Venkatasubramanian, Cupertino, CA (US); Roger Bolsius, Round Rock, TX (US); Harvard Pan, Boston, MA (US); Alextair Mascarenhas, Foster City, CA (US); Saugata Chowdhury, Sunnyvale, CA (US); Venugopal Surendran, Santa Clara, CA (US); Ananth Venkata, San Ramon, CA (US); Jacques Vigeant, Fort Lauderdale, FL (US)

(73) Assignee: Oracle International Corporation, Redwood Shores, CA (US)

( * ) Notice: Subject to any disclaimer, the term of this patent is extended or adjusted under 35 U.S.C. 154(b) by 17 days.

(21) Appl. No.: 13/100,249

(22) Filed: May 3, 2011

(65) Prior Publication Data

US 2011/0295794 A1 Dec. 1, 2011

Related U.S. Application Data

(60) Provisional application No. 61/349,739, filed on May 28, 2010.

(51) Int. Cl.
*G06F 17/00* (2006.01)
*G06F 7/00* (2006.01)

(52) U.S. Cl.
USPC ............... 707/602; 707/802; 706/46; 706/50

(58) Field of Classification Search .................. None
See application file for complete search history.

(56) References Cited

U.S. PATENT DOCUMENTS

| | | | |
|---|---|---|---|
| 6,012,066 A | 1/2000 | Discount et al. | |
| 6,970,874 B2 | 11/2005 | Egilsson et al. | |
| 7,089,266 B2 | 8/2006 | Stolte et al. | |
| 7,275,024 B2 | 9/2007 | Yeh et al. | |
| 7,318,216 B2 * | 1/2008 | Diab | 717/108 |
| 7,401,064 B1 | 7/2008 | Arone et al. | |
| 7,676,478 B2 * | 3/2010 | Rausch | 707/999.1 |
| 7,720,803 B2 | 5/2010 | Unnebrink et al. | |
| 7,779,036 B2 * | 8/2010 | Subramanian et al. | 707/791 |
| 7,783,711 B2 * | 8/2010 | LeVasseur et al. | 709/206 |
| 8,086,598 B1 | 12/2011 | Lamb et al. | |
| 8,099,392 B2 | 1/2012 | Paterson et al. | |
| 2002/0194167 A1 | 12/2002 | Bakalash et al. | |
| 2003/0229610 A1 | 12/2003 | Van Treeck | |
| 2004/0083199 A1 * | 4/2004 | Govindugari et al. | 707/1 |
| 2004/0139061 A1 | 7/2004 | Colossi et al. | |
| 2005/0033726 A1 | 2/2005 | Wu et al. | |
| 2005/0065939 A1 | 3/2005 | Miao | |
| 2005/0187930 A1 * | 8/2005 | Subramanian et al. | 707/4 |
| 2005/0203931 A1 * | 9/2005 | Pingree et al. | 707/100 |
| 2006/0059028 A1 * | 3/2006 | Eder | 705/7 |
| 2006/0101017 A1 * | 5/2006 | Eder | 707/7 |
| 2006/0271528 A1 | 11/2006 | Gorelik | |
| 2007/0005713 A1 * | 1/2007 | LeVasseur et al. | 709/206 |

(Continued)

*Primary Examiner* — Angelica Ruiz
(74) *Attorney, Agent, or Firm* — Fliesler Meyer LLP

(57) ABSTRACT

An extender associated with a data warehouse can support metadata extension for the data warehouse. The extender can create an ETL extension plan for extending the data warehouse. The ETL extension plan includes one or more ETL plan elements that indicate extensions on ETL metadata objects. The one or more ETL plan elements within the ETL extension plan can be ordered, and ETL metadata extension can be performed based on the ETL extension plan.

18 Claims, 8 Drawing Sheets

U.S. PATENT DOCUMENTS

| | | | |
|---|---|---|---|
| 2007/0174308 A1* | 7/2007 | Rausch | 707/100 |
| 2007/0214111 A1* | 9/2007 | Jin et al. | 707/3 |
| 2007/0255741 A1* | 11/2007 | Geiger et al. | 707/101 |
| 2008/0027769 A1* | 1/2008 | Eder | 705/7 |
| 2008/0115135 A1* | 5/2008 | Behnen et al. | 718/101 |
| 2009/0018996 A1 | 1/2009 | Hunt et al. | |
| 2010/0088669 A1* | 4/2010 | Cwalina et al. | 717/106 |
| 2010/0106672 A1* | 4/2010 | Robson et al. | 706/50 |

* cited by examiner

SYSTEM AND METHOD FOR SUPPORTING DATA WAREHOUSE METADATA EXTENSION USING AN EXTENDER

CLAIM OF PRIORITY

This application claims priority to the following application, which is hereby incorporated by reference in its entirety: U.S. Provisional Application No. 61/349,739, entitled "SYSTEM AND METHOD FOR PROVIDING DATA FLEXIBILITY IN A BUSINESS INTELLIGENCE (BI) SERVER", filed on May 28, 2010.

CROSS REFERENCE TO RELATED APPLICATIONS

This application is related to the following applications which are incorporated herein by reference:

U.S. patent application Ser. No. 12/711,269 entitled "GENERATION OF STAR SCHEMAS FROM SNOWFLAKE SCHEMAS CONTAINING A LARGE NUMBER OF DIMENSIONS," by Samir Satpathy, filed on Feb. 24, 2010.

U.S. patent application Ser. No. 13/100,245, entitled "SYSTEM AND METHOD FOR PROVIDING DATA FLEXIBILITY IN A BUSINESS INTELLIGENCE SERVER USING AN ADMINISTRATION TOOL" by Raghuram Venkatasubramanian et al., filed on May 3, 2011.

U.S. patent application Ser. No. 13/100,248, entitled "SYSTEM AND METHOD FOR SPECIFYING METADATA EXTENSION INPUT FOR EXTENDING A DATA WAREHOUSE" by Raghuram Venkatasubramanian et al., filed on May 3, 2011.

U.S. patent application Ser. No. 13/100,255, entitled "SYSTEM AND METHOD FOR ENABLING EXTRACT TRANSFORM AND LOAD PROCESSES IN A BUSINESS INTELLIGENCE SERVER" by Raghuram Venkatasubramanian et al., filed on May 3, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention generally relates to data warehouses and business intelligence, and particularly to supporting data flexibility for a business intelligence (BI) server.

BACKGROUND

In the context of computer software, and particularly computer databases, the term "data warehouse" is generally used to refer to a unified data repository for all customer-centric data. A data warehouse environment tends to be quite large. The data stored in the data warehouse can be cleaned, transformed, and catalogued. Such data can be used by business professionals for performing business related operations, such as data mining, online analytical processing, and decision support. Typically, a data warehouse can be associated with extract, transform, and load (ETL) processes and business intelligence tools. The ETL processes are capable of extracting data from source systems and bringing the data into a data warehouse. The business intelligence tools are designed to report, analyze and present data stored in the data warehouse. This is the general area that embodiments of the invention are intended to address.

SUMMARY

In accordance with an embodiment, an extender associated with a data warehouse can support metadata extension for the data warehouse. The extender can create an extract, transform, and load (ETL) extension plan for extending the data warehouse. The ETL extension plan includes one or more ETL plan elements that indicate extensions on ETL metadata objects. The one or more ETL plan elements within the ETL extension plan can be ordered, and ETL metadata extension can be performed based on the ETL extension plan.

DETAILED DESCRIPTION

Figure 1:
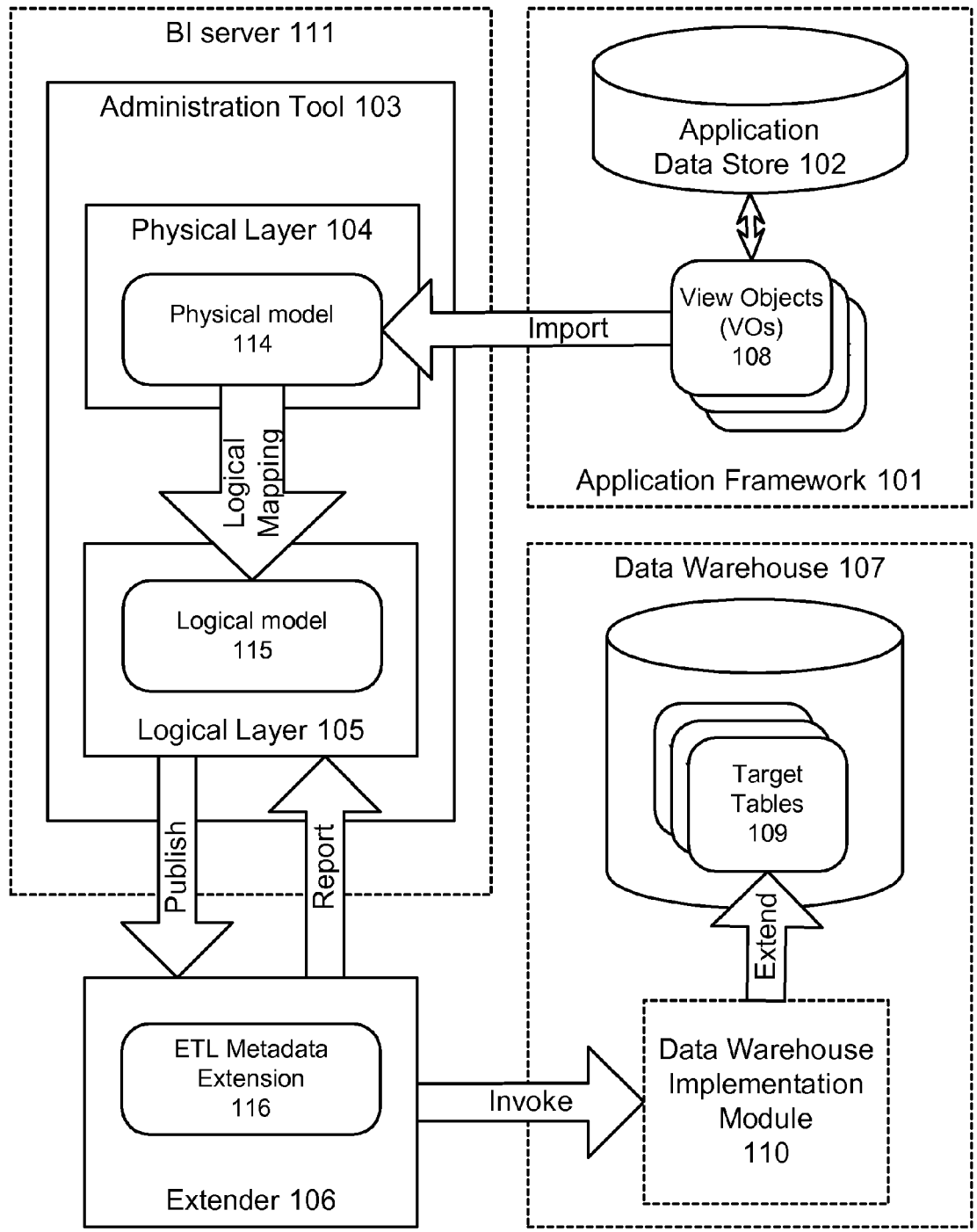
FIG. 1 illustrates an exemplary view of the data flow from an application framework to a data warehouse in accordance with an embodiment.

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. The description of the embodiments of the invention as following uses the Oracle Database Integrator (ODI) data warehouse and Informatica (INFA) data warehouse as examples for data warehouse platform. It will be apparent to those skilled in the art that other types of data warehouse platform can be used without limitation. The description of the embodiments of the invention as following uses the Oracle Application Development Framework (ADF) as examples for application framework. It will be apparent to those skilled in the art that other types of application framework can be used without limitation.

As described herein, a data warehouse can be used to store critical business information. Business intelligence (BI) applications running on top of the data warehouse can provide powerful tools to the users for managing and operating their business. These BI tools can not only help the users run their day-to-day business, but also help the users make critical tactical, or even long term strategic, business decisions.

There can be different types of BI applications used in the enterprise environment, such as sales, marketing, supply chain, financial, and human resource applications. An application framework, such as ADF, can be used to implement the different types of BI applications. Each BI application can store and use one or more application data objects in its own application data store, outside of the data warehouse.

A BI server can reside between the BI applications and the data warehouse. The BI server allows the BI applications to use high-level analytical queries to scan and analyze large volumes of data in the data warehouse using complex formulas, in order to provide efficient and easy access to information required for business decision making. The BI applications can rely on the BI server to fulfill its analytic requirement.

A data warehouse can be sourced from multiple data source systems associated with the BI applications. As such, a BI server can associate an entity in the target data warehouse with data objects from multiple data sources, by extracting data from the various data sources into a single staging area, where the data conformance is performed before the conformed data can be loaded into the target data warehouse.

Furthermore, when BI applications make changes, or extensions, on the application data objects in application data store. The BI server can propagate the changes and the extensions on the application objects in the application framework to the underlying data warehouse that stores the data in the application objects.

The BI server uses extract, transform, and load (ETL) processes to extract data from the outside data sources, transform the source data to fit operational needs, and load the data into the target data warehouse. ETL metadata can be used to define and manage the ETL processes associated with the data warehouse. Such metadata are essential to the data warehouse and the BI systems on top of the data warehouse. An administration tool on the BI server allows a user to interact with the BI server, and manage the extension process of the underlying data warehouse through metadata.

FIG. 1 illustrates an exemplary view of the data flow from an application framework to a data warehouse in accordance with an embodiment. As shown in FIG. 1, one or more application data objects, such as view objects (VOs) 108 that are associated with the data in the application data store 102, can be used in an application framework 101, such as an application development framework (ADF). In an embodiment, the VOs can have a query that fetches a record from an application data store. In another embodiment, the VOs can contain implementation logic which is used to manipulate the data fetched by the VO query.

An administration tool 103, provided by a BI server 111, includes a physical layer 104 and a logical layer 105. The physical layer of the administration tool defines the data sources, to which the BI server 110 submits queries. The physical layer includes a physical model 114 that defines the relationships between the physical source databases and other data sources that are used to process multiple data source queries. The logical layer of the administration tool captures business, or logical, model of the data. The logical layer uses a logical data model 115 that defines the data in a data warehouse 107 in detail, without regard to how they are physical implemented in the database.

The administration tool allows the VOs to be imported from the application framework into the physical model based on related metadata. Then, the updated physical model in the physical layer can be mapped to the logical model in the logical layer within the BI server administration tool.

The administration tool can detect changes in the VOs and publish these changes to a backend extender 106 associated with the data warehouse. The extender can make changes to ETL metadata before applying the changes to the target tables 109 in the underlying data warehouse. The ETL metadata can include information on data transformation logics, data manipulation language (DML) options and target/source table.

The backend extender can generate one or more metadata extensions 116 based on changes in the VOs. The metadata extensions include detail metadata changes that can be used by the extender to extend the data warehouse.

Also as shown in FIG. 1, the ETL metadata extensions can be relayed from the extender back to the administration tool. The administration tool can then update the logical model, physical model, and related metadata, and allow the extender to extend the data warehouse.

In an embodiment, the extender can invoke an implementation module 110 that is associated with the data warehouse to make physical changes on the target tables in the data warehouse. Since the implementation and internal structure of the data warehouse varies, different implementation modules can be invoked by the extender for extending different data warehouses. Furthermore, the implementation module can be provided by a particular underlying data warehouse, so that the implementation module can have access to the target tables from within the data warehouse.

Figure 2:
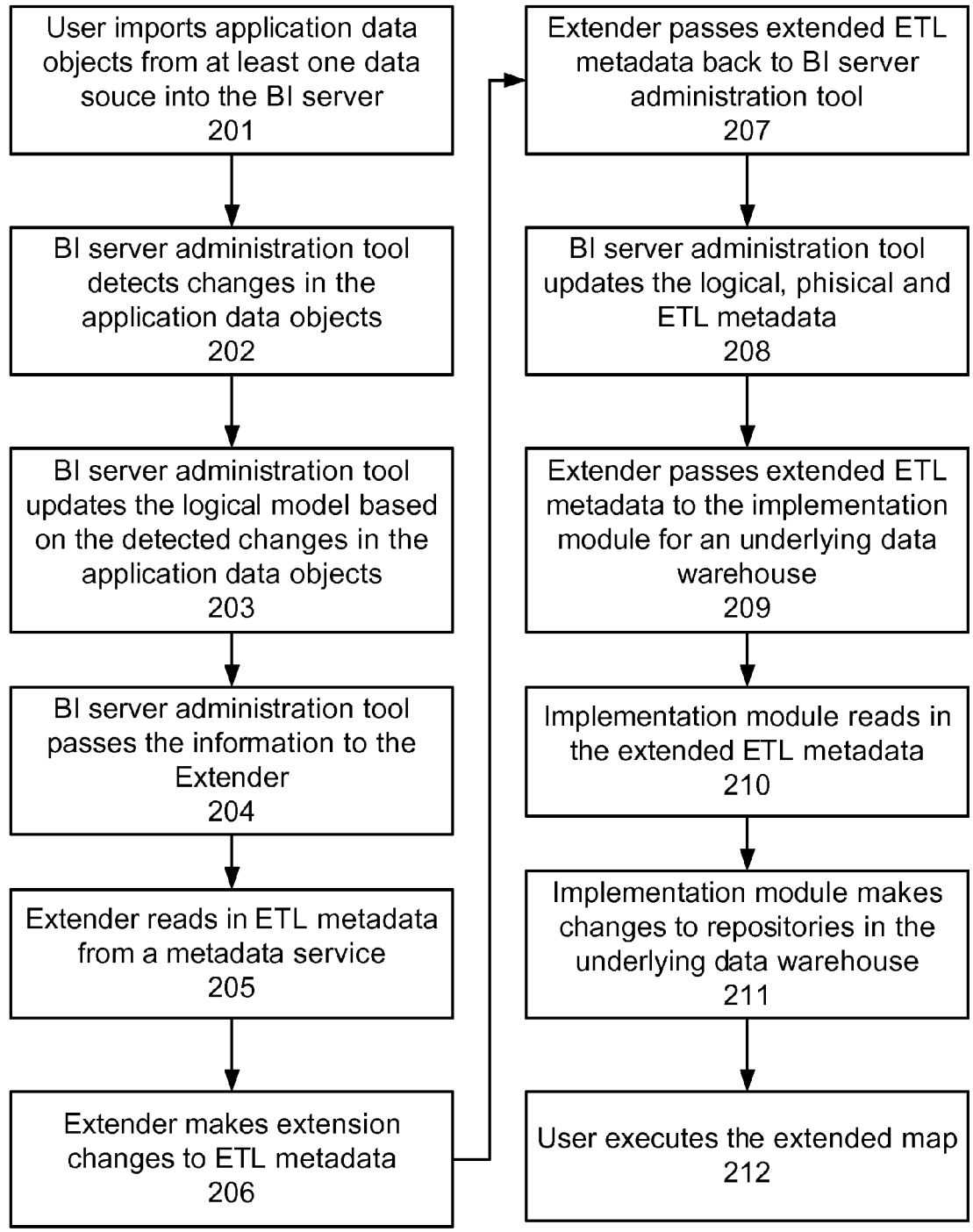
FIG. 2 illustrates an exemplary work flow for supporting data flexibility in a business intelligence server associated with a data warehouse in accordance with an embodiment.

FIG. 2 illustrates an exemplary work flow for supporting data flexibility in a business intelligence server associated with a data warehouse in accordance with an embodiment. As shown in FIG. 2, a user can first import application data objects from the application framework into a physical model in the logical layer, via the BI server administration tool, at step 201. The BI server administration tool can detect changes in the application data objects, at step 202, and updates the logical model in the logical layer based on the detected changes in the application data objects, at step 203. Then, the BI server administration tool can pass the information to the extender, at step 204. Since the imported information from the application framework may not be sufficient, the extender can read in ETL metadata from a metadata service (MDS), at step 205. Then, the extender can make extensions to the ETL metadata at step 206, and passes the extended information back to the administration tool at step 207. After the BI server administration tool updates the logical model, physical model and ETL metadata, at step 208, the extender passes the extended ETL metadata to a data warehouse implementation module to update the data warehouse, at step 209. Finally, the data warehouse implementation module can read in the extended ETL metadata, at step 210, and make changes to the data repositories, at step 211, before a user can execute the extended maps, at step 212.

ETL Metadata Extension

In accordance with an embodiment, ETL extender can make extensions to an underlying data warehouse, based on the imported information on ETL changes and ETL metadata stored in a metadata service.

Figure 3:
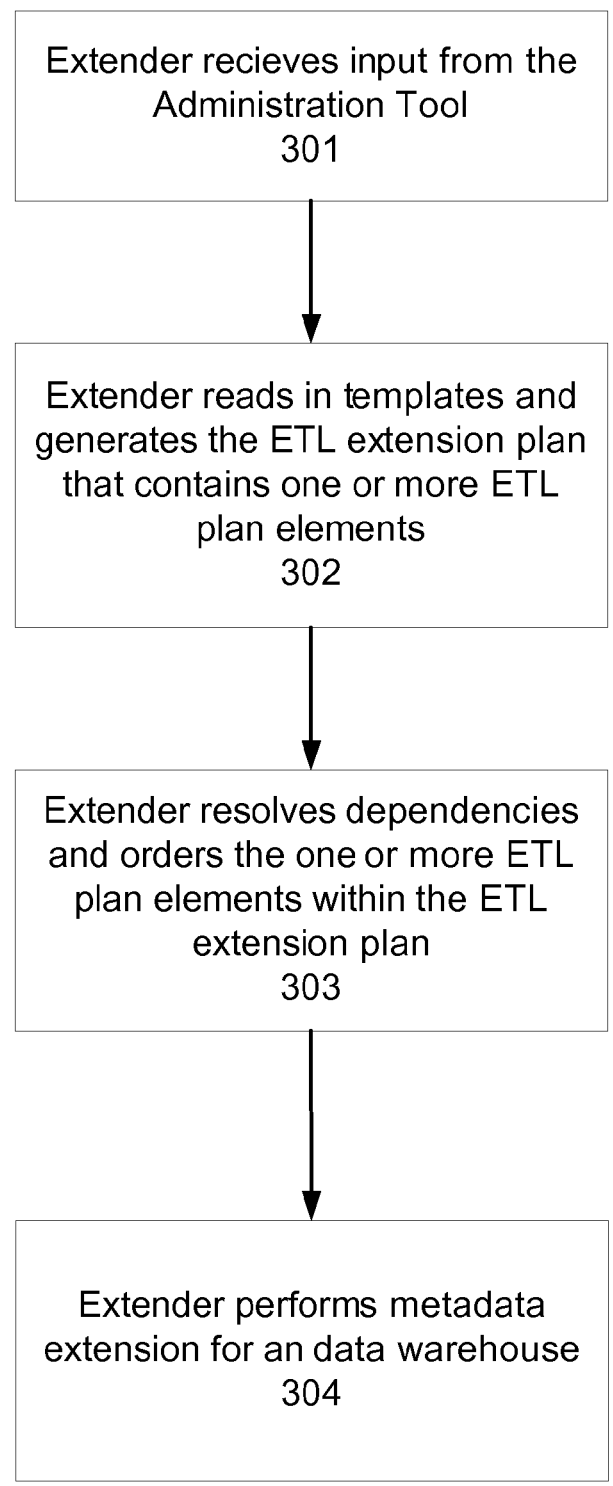
FIG. 3 illustrates an exemplary work flow that shows how to apply input specification on the ETL metadata in the extender in accordance with an embodiment.

FIG. 3 illustrates an exemplary work flow that shows how to apply input specification on the ETL metadata in the extender in accordance with an embodiment. As shown in FIG. 3, an ETL extender receives the inputs from the administration tool at step 301. Then, the extender can read in templates and generate an ETL extension plan at step 302.

In accordance with an embodiment, the ETL extension plan is a data structure that indicates the types of ETL objects that need to be created, dropped, and/or altered. The ETL plan contains a plurality of ETL plan elements that can be represented in a hierarchy fashion, such as a parent-child tree format with a root node at the top.

The ETL plan elements contain details on the types of changes that are required for the extension of the data warehouse. For example, a table plan element can carry information, such as the name of the table, the container the table needs to be in, the columns the table has, the keys the table has, etc. There can also be column plan elements, key plan elements, and mapping plan elements. The column plan element can contain its data type. The mapping plan element can carry information on the target table, the source tables, the joins between these source objects, the filters to be applied, the column mapping expressions etc.

In accordance with an embodiment, the ETL plan elements are abstract or conceptual ETL elements, and are not specific to any ETL tool. For example, a mapping plan element can be implemented either into an ODI Interface in an ODI data warehouse, or an INFA mapping in an INFA data warehouse, using a corresponding ETL tool.

Then, the extender resolves dependencies and orders the ETL plan elements within the ETL extension plan at step 303. In accordance with an embodiment, the extender can build a graph internally to depict the ordering of the plan elements.

Finally at steps 304, once the plan elements are correctly ordered, the extender connects to a data warehouse, and performs metadata extension for the data warehouse.

In accordance with an embodiment, a specific ETL metadata extender for an underlying data warehouse can be used to process the plan elements in an ETL plan. After the extender runs through all the correctly ordered plan elements, the updated ETL metadata can reflect the extension in the ETL plan.

There can be different ETL metadata extenders. For example, an ODI extender can be used for extending the ODI data warehouse and an INFA extender an be used for extending the INFA data warehouse. In an embodiment, the ODI extender can connect to an ODI data warehouse, and uses the ODI implementation to perform metadata extension for the ODI data warehouse. The ODI implementation goes through the ordered extension plan and performs extension on ODI metadata objects. In another embodiment, the INFA extender can connect to an INFA data warehouse, and uses the INFA implementation to perform metadata extension for the INFA data warehouse. The INFA extender downloads required maps from INFA data warehouse, reads in INFA templates, applies ordered extension plan on the different templates and loads the extended repository back into INFA data warehouse.

In accordance with an embodiment, an ETL tool can be associated with the underlying data warehouse in order to generate corresponding metadata extension for the specific underlying data warehouse. The ETL tool can throw exceptions if the order of element creations or deletions within the ETL tool is not followed. For example, the ETL tool can throw an exception if the user attempts to create a mapping for a table without registering the table first. On the other hand, the ETL tool can throw an error if a user attempts to remove a table before removing the mappings that load this table.

Figure 4:
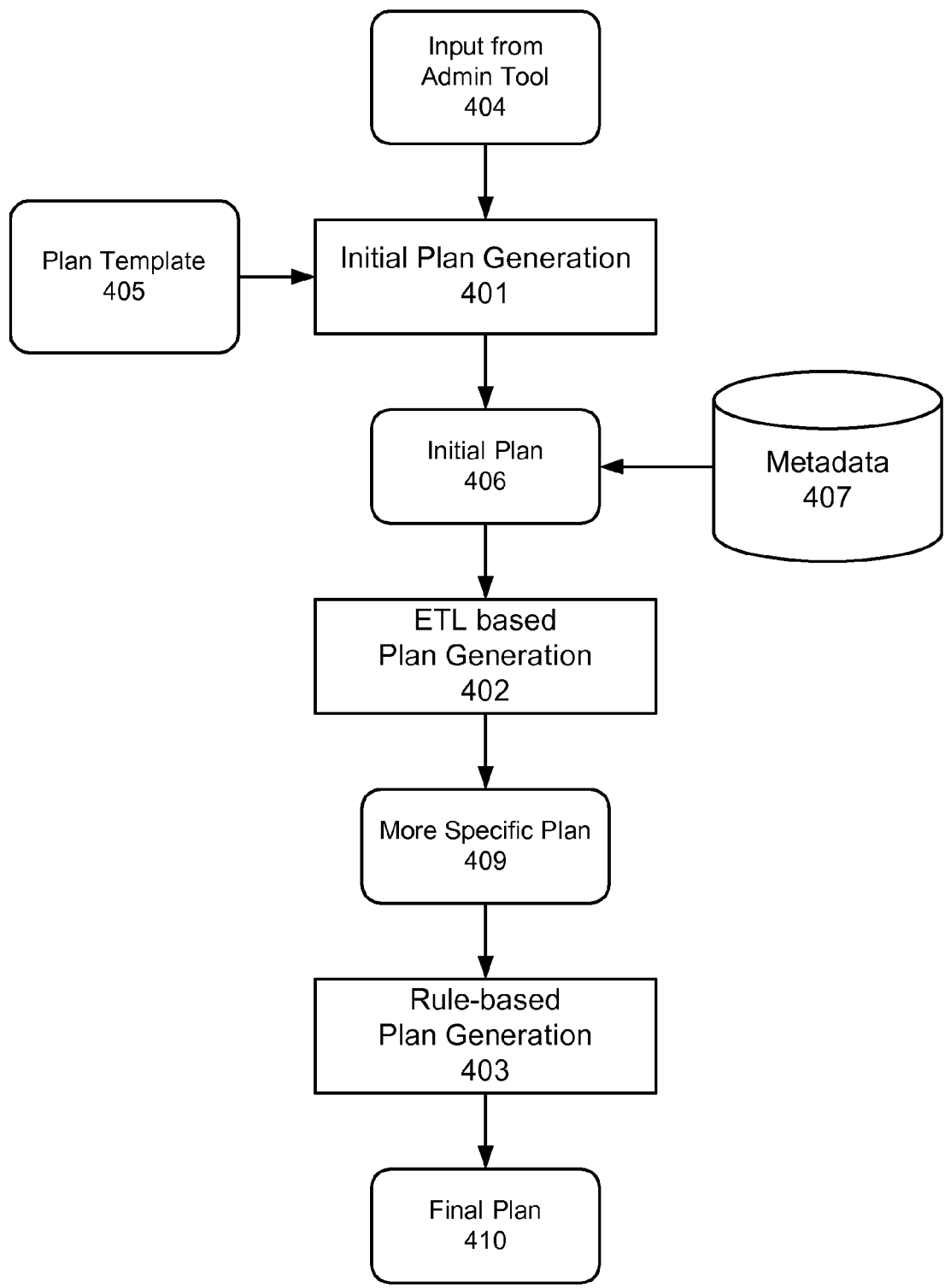
FIG. 4 illustrates an exemplary work flow to generate a detailed extract, transform, and load plan in accordance with an embodiment.

FIG. 4 illustrates an exemplary work flow to generate a detailed ETL plan in accordance with an embodiment. As shown in FIG. 4, the generation of a detailed ETL plan includes several steps: an initial plan generation step 401, an ETL based plan generation step 402, and a rule based plan generation step 403.

At the initial plan generation step, the extender can apply the input specifications 404 from the administration tool on top of the plan template 405 and generate an initial plan 406.

The input specifications for the extender come from the BI server administration tool. The input specifications describe both the source point and target end points. The source point describes the source data image, which is the data that needs to be loaded into the dimension table or fact table in the underlying data warehouse. The target end point describes the dimension table or fact table that needs to be extended. The target end point can also describe the new dimension table to be created.

The plan template can contain one or more initial plan elements. Every initial plan element in the plan template can have a creation mode associated with it. For example, there can be a search mode; a search—create mode; a search—alter mode; a delete mode; and a delete—create mode. An element in search mode is only searched for existence within the ETL metadata. If the element can not be found and the situation does not allow it, an exception is thrown and extensions cannot be continued. An element in search—create mode is created, if the element searched for does not exist in the ETL metadata. If the element already exists, nothing needs to be done. Similarly, an element in search—alter mode is altered, if the element exists. Otherwise, nothing needs to be done. An element in delete mode is dropped from the metadata, if the element exists in the ETL metadata. An element in delete—create mode is dropped first and then recreated, if the element exists in the ETL metadata. If the element does not exist, the element is created.

In accordance with an embodiment, the extender can pick up a correct plan template based on the different types of input once the input specification is received. Then, the extender can open the correct plan template to process the input specification. In an embodiment, the plan templates can also be in XML format.

At the ETL based plan generation step, the extender can read more metadata 407 from the underlying data warehouse in order to refine the plan further. The ETL plan elements can be processed differently for different underlying data warehouse.

At the rule based plan generation step, a specific ETL extension plan can be checked for consistency. Different rules can be enforced in order to generate a final plan, which is a rule based plan that can be used in modifying the specific ETL metadata.

In accordance with an embodiment, an ETL extension plan can be deleted. Also, a same ETL metadata extension run based on a particular ETL extension plan can be repeated for many times. If a first run produced some changes that is not needed for a second run, the corresponding changes in metadata caused by the first run need to be removed. The identification of what needs to be removed can be specified in the plan templates.

Deletions of the plan elements are important in order to cleanly remove old information. If the ETL plan specifies deletions, then a deletion plan is generated and run first. This cleans up the old information from the ETL repository. Then, the creation plan is constructed and run to create the elements back. During the run, some of the logic can be changed. For example, existing column mapping can be from T1.column1 to a target column, while the new logic can be from T1.column2 to the target column.

ODI Extender

In accordance with an embodiment, an ODI extender can create and modify metadata extension for an ODI data warehouse based on the ETL plan elements that are correctly ordered.

Figure 5:
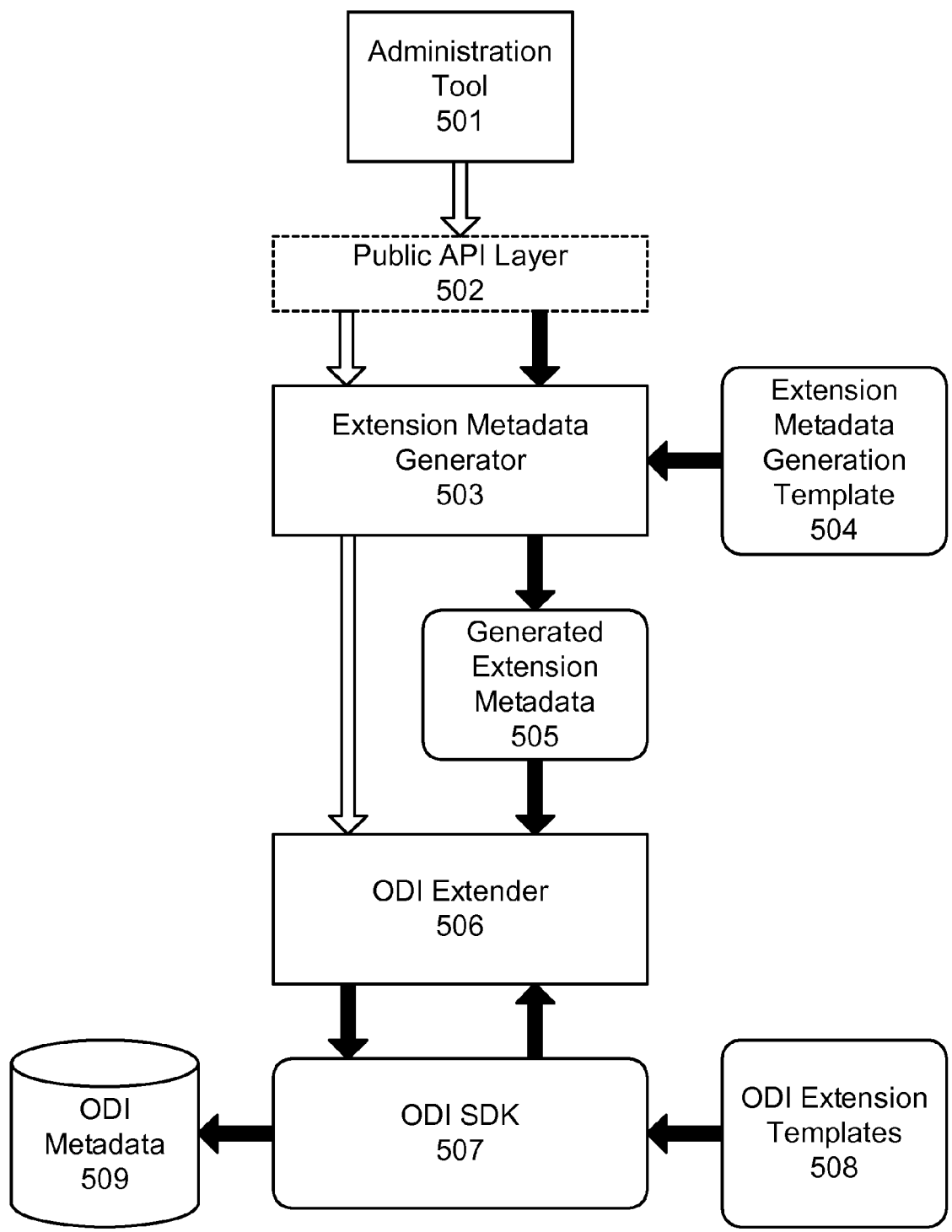
FIG. 5 illustrates an exemplary workflow that shows template based Oracle Database Integrator metadata extensions for extract, transform, and load in accordance with an embodiment.

FIG. 5 illustrates an exemplary workflow that shows template based ODI metadata extensions for ETL in accordance with an embodiment. As shown in FIG. 5, the administration tool 501 can access an extension metadata generator 503 via a public API layer 502. The extension metadata generator can convert the high-level extension metadata, as specified in the ETL plan, into a more detailed set of internal extension metadata 505 that the ODI extender 506 can use. In the meantime, the extension metadata generator can also communicate directly with the ODI extender. The ODI extender then takes each extension instruction and reads in the ODI extension templates 508 from ODI repository and makes the incremental changes to ODI metadata 509.

There can be several processors for ODI metadata extensions, such as extension metadata generator and the ODI extender. In accordance with an embodiment, the extension metadata generator can provide all the metadata needed for the ODI Extender. For example, if a new interface is required, the metadata generator can generate the necessary information for the ODI Extender. In an embodiment, the Administration Tool is completely shielded from this responsibility.

The extension metadata generator can use the extension metadata, represented in XML document, to create the internal extensions metadata. This internal extensions metadata can be shield from the end user. The extension metadata can carry detailed instructions to the ODI Extender in terms of the interfaces to create or modify, ODI templates to use, the column mapping template to track, and so on. For example, if a flex segment dimension needs to be created, the templates can describe the creation of an extract "SDE" interface and a load "SIL" interface. As a result, the generated Extensions metadata can be used along with the ODI templates to provide all the needed information for the ODI Extender to make the extensions.

Templates can carry information regarding to the metadata elements that need to be created in ODI data warehouse to implement the extensions. There are two kinds of templates: the ODI extension templates and the extension metadata generation templates 504.

ODI extension templates, which are ODI metadata components, can include ODI interfaces, packages, lookup functions, lookup interfaces, and regular functions. The ODI extension templates provide the logic to the ODI Extender to extend the ODI metadata components.

The extension metadata generation templates and the ODI extension templates can capture the standards and methodologies that users implement the ODI metadata. There can be different kinds of standards for implementing the ODI metadata. One exemplary standard describes how the ODI metadata components are created, for example, the interfaces to be created, the packages to be created, the models to be created, and the KM attached to the different kinds of Interfaces. Another exemplary standard describes the details within each ODI metadata component, for example, the way a user FK is translated into surrogate FK in an interface, or the way a dependency package is defined to load the dimensions first before the facts.

As shown in FIG. 5, ODI extender can make ODI metadata changes via the ODI SDK. 507. The ODI SDK can make ODI metadata changes, such as addition of new dimension to bring in a new key flex segment; extension to facts to have a new key referencing this newly created dimension; extension to facts to have a new key referencing existing flex dimensions or existing standard dimensions; extensions to dimensions with key flex foreign keys to other dimensions; descriptive flex extensions to both facts and dimensions.

In accordance with an embodiment, The ODI SDK can include several modules: a create module to help in creating all the needed ODI components; a delete module to help in cleaning out from ODI data warehouse all the un-needed extension components like columns, mappings, filters, joins and so on; and a diff module that can look at the incoming definition of a dimension or fact and query existing metadata in ODI to determine the changed required. The diff module can be used to generate a diff document that can be presented to the end user.

The generated extensions metadata contains extension information for both dimension tables and dimension staging tables. Additionally, the generated extensions metadata can contain extension information for both fact tables and fact staging tables. The workflow for extending a dimension is similar to the workflow for extending a fact, except that the dimensions are processed before the facts.

Figure 6:
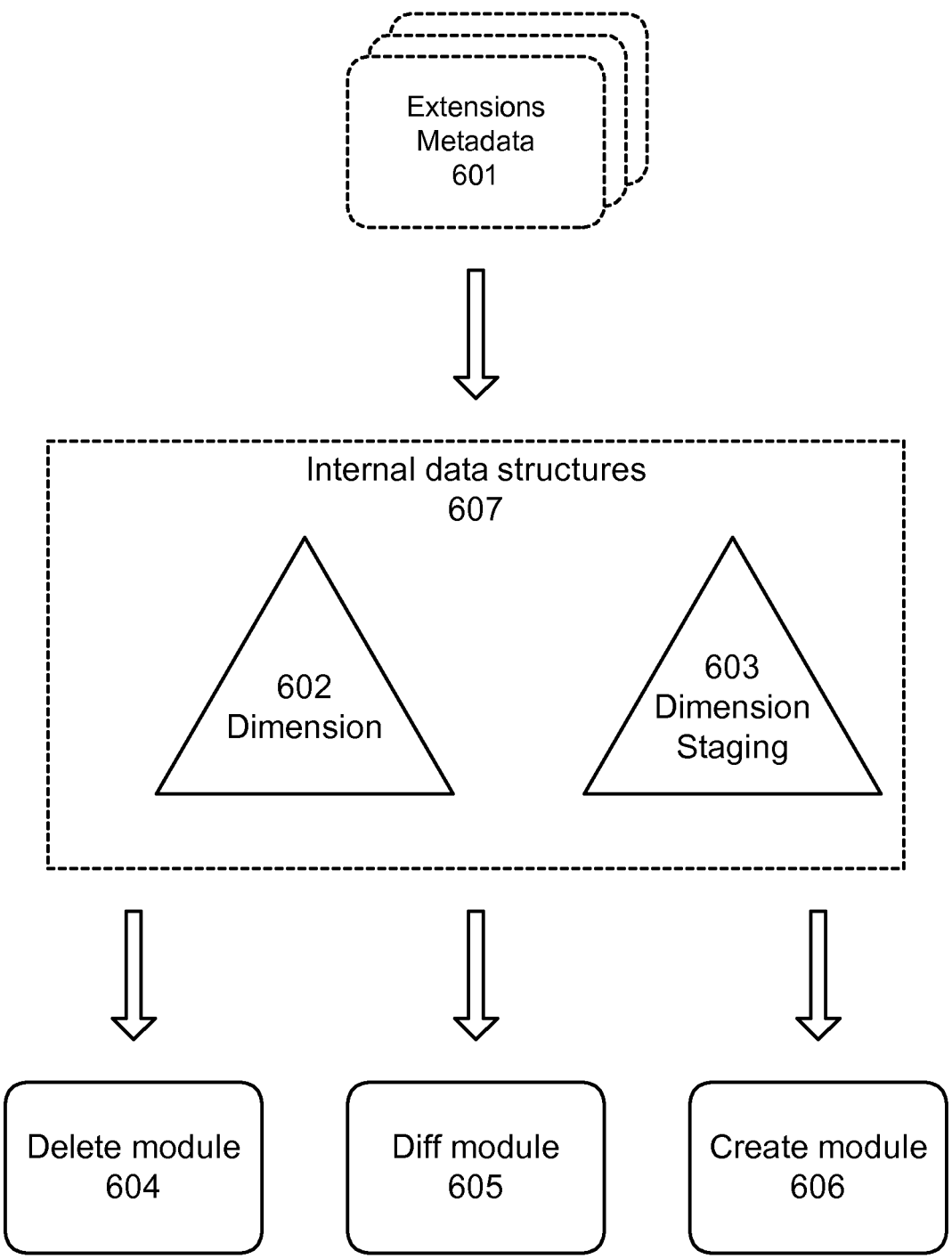
FIG. 6 illustrates an exemplary workflow that shows high-level logic of Oracle Database Integrator metadata extensions in accordance with an embodiment.

FIG. 6 illustrates an exemplary workflow that shows high-level logic of ODI metadata extensions in accordance with an embodiment. As shown in FIG. 6, the dimension information 602 and the dimension staging information 603 can be converted into internal data structures 607 consumed by the different modules 604, 605 and 606.

In order to create a new dimension, the ODI Extender can create an ETL flow for this new dimension, based on an input received from the administration layer regarding this new dimension. In the input, the administration layer passes the following information to the ODI extender: short name of the dimension; business name of the dimension; columns of the dimension; and source tables/ADF VO for the column mappings. Based on this high level input and the templates that the ODI extender carries, the extender can make necessary changes in ODI metadata.

In accordance with an embodiment, the ODI metadata changes for creating a new dimension includes: model creations, interface creation, package creations, and dependency Package Extensions.

ODI carries a model definition of the dimension and the dimension staging table. For example, the ODI extender can create a new dimension W_COST_CENTER_D and a new dimension staging table W_COST_CENTER_DS, when the administration layer of the BI server detects a new "Cost Center" dimension. The model carries the column information and also carries key and reference information. For example, the "created_by_wid" can be a foreign key to the User Dimension. These keys and references are created in the new dimension.

ODI also uses metadata such as different interfaces for defining ETL mapping. Interface can define the source tables and columns and how they map to the target. There can be two new interfaces: an extract interface to load the staging table; and a load interface to load the dimension table.

The extract interface can extract the data from the source tables and load them into the staging table. Based on the template, a source table can be placed in the extract interface. Then, the staging table is placed as the target data store in the extract interface. For each of the columns in the dimension, based on the template, column mappings are created.

The load interface can move the data from the staging table to the target dimension table. Again, based on template, source staging table is placed in the load interface; then, the target is placed in the load interface and it's the dimension table. If lookup dimensions are required (for example, "created_by_wid"), then the lookup dimensions are placed in the load interface and joins are created. Column mappings are created for each column of the dimension and the template. For example, the primary key "ROW_WID" can be loaded from a sequence based on information in the template.

In accordance with an embodiment, the package creation can also be template based. Packages are similar to workflows, allowing users to define conditional execution of the interfaces. Packages can also tie Interfaces together. For example, a "Load Cost Center Dimension" package can first fire the extract interface and then fire the load interface. Packages can also be compiled into scenarios that can execute the "snapshot" of the package when the scenario is created. Furthermore, ODI extender can build a scenario for a package and register this scenario in a master dependency package. For example, in the master dependency package, the load interface for Cost Center dimension is registered along with the other dimensions.

Additionally, ODI Extender can remove un-needed extension metadata. For example, the ODI metadata can have a W_COST_CENTER_D dimension, which has at least one Cost Center Code column. At a later point in time, the administration layer sends in extension metadata that indicates the Cost_Center_Code is no more a valid column in the dimension. The database schema for W_COST_CENTER_D may already have changed and this column is no longer in the database table. The ODI Extender can remove this column from ODI metadata, to prevent a failure in the ETL run, since an attempt can be made to load the cost center code column. In this example, the ODI extender detects that W_COST_CENTER_D existing in ODI metadata and call on the delete module to remove this column from the interfaces and data stores. Additionally, the column is removed from the staging data store, from the dimension data store, from the interface column mappings and any joins and filters on this column are also removed. And, if there is any extension based index or constraints on this column, those are removed as well.

Once the dimension flow is created, ODI extender can create the fact flow. If the fact mappings already exist, the ODI extender extends existing mappings without creating new fact mappings.

For the facts to be extended, the administration layer passes on these information to the ODI extender: short name of the fact; business name of the fact; name of the new foreign key column and the data type; the key flex segment dimension it references; and source tables/ADF VO for the column mapping.

The fact model and the fact staging table model can also be extended. The new columns are added. In the fact model, foreign key reference is setup with the flex dimension. Staging table does not have this reference setup.

Once the model is extended, the extract and load interfaces can be extended for the fact. The extract interface can load the data from the source table/ADF VO into the fact staging table for the new foreign key column. This is a straight mapping from the source to the staging table. The load interface can convert the user key foreign key into surrogate key. ODI extender can bring in the new dimension as a lookup table and pull the surrogate key into the fact table. All these changes are template based. ODI extender can figure out the actions it needs to execute based on the templates associated with the ODI extender.

Then, the ODI extender can determine un-needed columns and joins and filters and these are removed from ODI metadata. Additionally, after a series of extensions happened, the ODI extender allows users to rollback any one of them. Also, ODI extender allows multiple transaction systems pushing data into one warehouse.

INFA Extender

In accordance with an embodiment, an INFA extender can create and modify metadata extension for an INFA data warehouse, based on the correctly ordered ETL plan elements.

Template processing can be used to create extension flows in INFA maps. Once the ETL plan is ready, the extender can give the control over to the INFA extender, which can open the correct INFA template. The idea is that the templates can capture the ETL flow logic, which can be used to create the extension flow in the actual map.

Templates can provide the extender with details for making changes in INFA maps. These INFA templates, which carry sample flows, include INFA map elements. The sample flows and the sample elements in the map can provide the INFA extender with the information to correctly make changes to the INFA maps, such as undertaking key flex extension to an existing fact.

In accordance with an embodiment, the INFA extender can carry pre-built template maps in XML files. The INFA extender can upload these map elements into its internal data structure. The INFA extender can understand and make modifications to these INFA map elements. The INFA extender can take the ETL plan and use that information to make modifications to the template INFA maps. After the template maps are modified in memory, the results are merged with the actual map at the user site. The INFA extender can then upload these changed maps back into the repository with the extensions in the user's repository.

Different templates can be loaded in based on the extension input. Template processing matches the different elements in the template map, such as transformations, mapplets, targets and sources, with the elements in the actual INFA map using a kind of pattern matching. Then, the different template map elements can be renamed to match with the elements in actual map. Template processing also trims the template map; does any needed name changes on the map elements and their ports; and also makes changes to the needed SQL statements.

Figure 7:
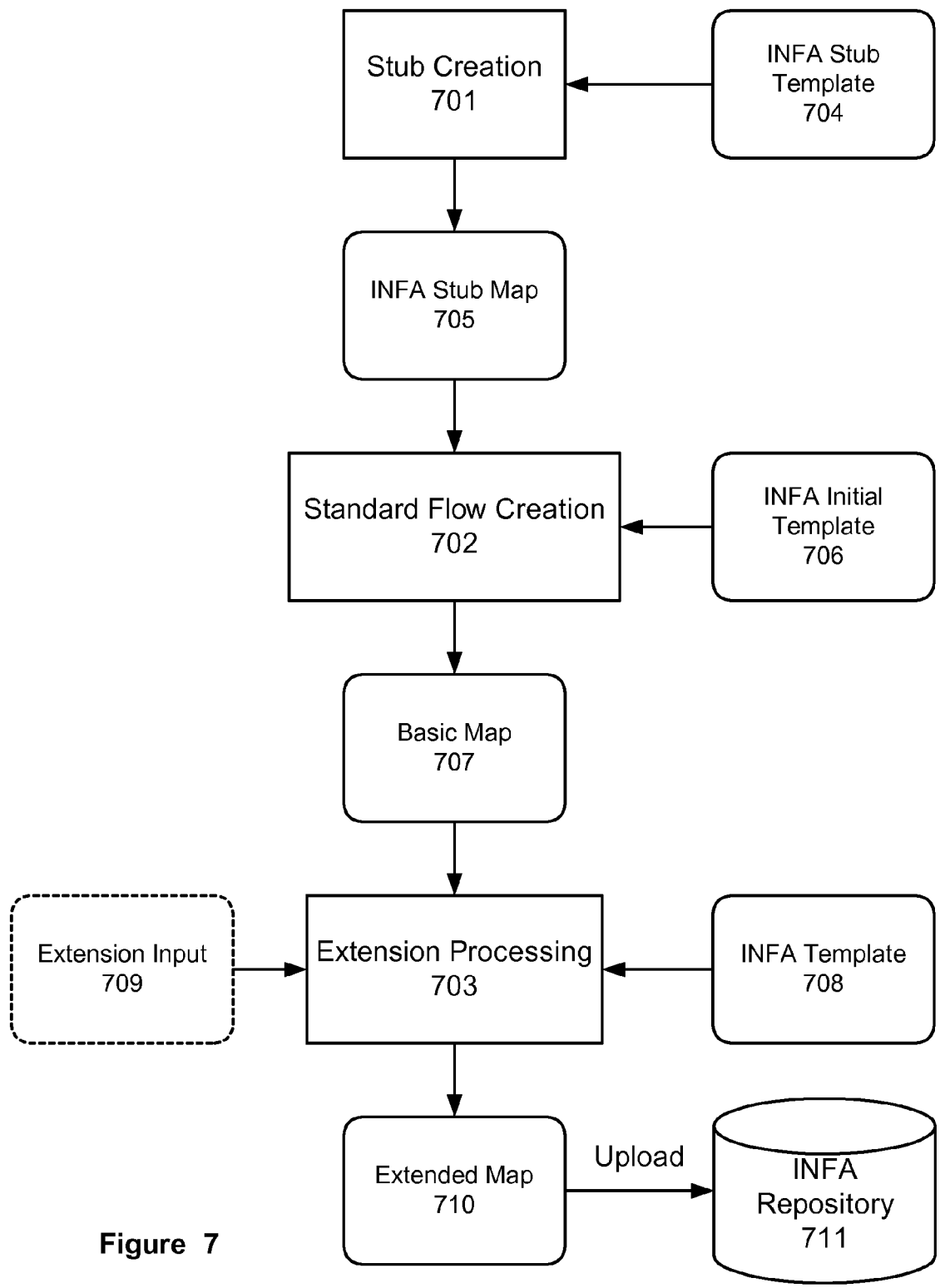
FIG. 7 illustrates an exemplary workflow for creating extension flows in Informatica maps in accordance with an embodiment.

FIG. 7 illustrates an exemplary workflow for creating extension flows in INFA maps in accordance with an embodiment. As shown in FIG. 7, the process for creating an extended map 710 can include a stub creation step 701, a standard flow creation step 702, and an extension processing step 703. At the stub creation step, the extender opens stub templates 704 in order to create a stub map 705. Then, at the standard flow creation step, the extender opens initial map templates 706 to create a basic map 707 based on the created stub map. Then, at the extension processing step, the extender can incorporate further additional INFA templates 708 and extension inputs 709 to create a full map 710 based on the basic map. Finally, at the end of the process, the extended map can be uploaded into the INFA repository 711.

Figure 8:
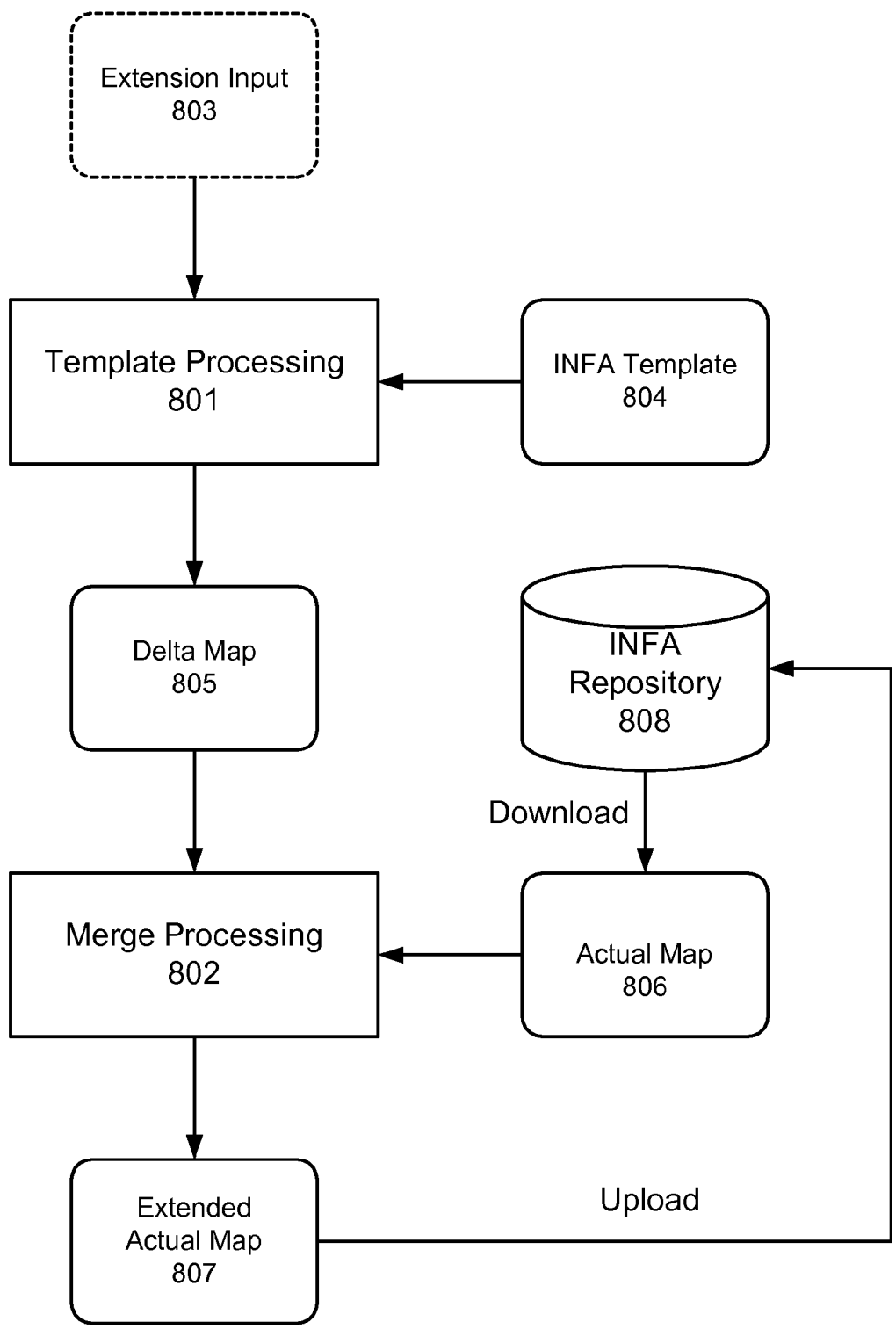
FIG. 8 illustrates an exemplary workflow for map creation based on different templates in accordance with an embodiment.

FIG. 8 illustrates an exemplary workflow for map creation based on different templates in accordance with an embodiment. As shown in FIG. 8, a template processing step 801 and a merge processing step can be used to extend an actual map 806 that was downloaded from the user's repository 808.

At the template processing step, base don extension input 803 and INFA templates 804, a template processor can produce a delta map 805. The delta map is an image of the actual map. The delta map is smaller in size, with only the necessary elements to represent the extension image. In accordance with an embodiment, at the template processing step, the template processor can match a INFA template with the actual map. The actual map can have the INFA template as its blue print. For example, most of the load maps use a load template. Users can customize these maps and added more transformations and flows.

At the merge processing step, the delta map can be merged with the actual map. The extension changes can be transferred over to the extended actual map 807 with conflict resolutions resolved. Finally, the extended actual map can be uploaded into the repository.

Extending the Underlying Data Warehouse

In accordance with an embodiment, in order to perform the ETL metadata extension, the extender sends the ETL metadata change document back to the administration tool. The administration tool can use the change document to update the physical metadata regarding to the changes made in the warehouse. The Administration tool can update the metadata based on the changes received from the extender. The extender can send back an XML document to the Java Client. The Java Client can then parse this output and return back a row set to the Administration tool. For example, the row set can contain name of the object, type of the object, parent of the object, physical table, physical column, physical table key, and physical table foreign key.

The data warehouse objects can be mapped back to the logical layer. The extender can also provide information on which VO objects caused these data warehouse objects to be extended. This allows the Administration tool to trace and find the logical objects. Using this information, the Administration tool can then create logical table sources mappings for the warehouse objects in the same logical layer objects.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for extending extract, transform, and load (ETL) metadata, wherein the ETL metadata defines ETL processes for a data warehouse, the method comprising:
   detecting changes in one or more data objects that are associated with one or more application data stores;
   passing the detected changes to an extender associated with a data warehouse;
   creating, via the extender, an ETL extension plan that executes on one or more microprocessors including
      receiving input specifications that define data to be loaded and tables to be extended in the data warehouse,
      reading an ETL plan template from a metadata service based on the input specifications,
      generating an initial plan by applying the input specifications to the ETL plan template,
      refining the initial plan by reading, from the data warehouse, an additional metadata that defines the data warehouse, and including in the refined plan one or more ETL plan elements specifying modifications to be made to the data warehouse to accommodate the detected changes in the data objects, and
      checking consistency and resolving dependencies among the plan elements in the refined plan to generate a final plan;
   organizing the one or more ETL plan elements in the final plan into an order which denotes a sequence in which the plan elements are to be executed in the data warehouse; and
   performing an ETL metadata extension based on the ETL extension plan to extend the data warehouse.

2. The method according to claim 1, wherein:
each said ETL plan element is an abstract element that is implemented to work with a particular warehouse.

3. The method according to claim 1,
wherein the plan template contains one or more plan elements that has a creation mode.

4. The method according to claim 1, further comprising:
deleting the ETL extension plan.

5. The method according to claim 1, further comprising:
processing the one or more ETL plan elements differently for a different underlying data warehouse, wherein the one or more plan elements are independent from any particular data warehouse.

6. The method according to claim 1, further comprising:
converting each said plan element into a detailed set of internal extension metadata for a particular data warehouse.

7. The method according to claim 1, further comprising:
reading in one or more specific templates for a particular data warehouse, wherein the particular data warehouse is associated with the ETL metadata; and
making incremental changes to the ETL metadata.

8. The method according to claim 1, further comprising:
representing extension metadata in XML document that is shipped to an end user's site.

9. The method according to claim 1, further comprising:
relying on template processing to create an extension flow that is represented in a delta map, which is merged with an actual map to transfer one or more extension changes to the actual map representing a particular data warehouse.

10. A system for extending extract, transform, and load (ETL) metadata, wherein the ETL metadata defines and manages ETL processes for a data warehouse, comprising:
   one or more microprocessors;
   a business intelligence (BI) server that detected changes in one or more data objects that are associated with one or more application data stores, an extender, running on the one or more processors, which is capable of creating an ETL extension plan for the data warehouse, including receiving input specifications that define data to be loaded and tables to be extended in the data warehouse, reading an ETL plan template from a metadata service based on the input specifications, generating an initial plan by applying input specifications to the plan template, refining the initial plan by reading from the data warehouse an additional metadata that defines the data warehouse and including one or more ETL plan elements specifying modifications to be made to the data warehouse to accommodate the detected changes in the data objects, and checking consistency and resolving dependencies among the one or more plan elements in the refined plan to generate a final plan;

organizing the one or more ETL plan elements in the final plan into an order which denotes a sequence in which the plan elements are to be executed in the data warehouse; and performing an ETL metadata extension based on the ETL extension plan in order to extend the data warehouse.

11. A non-transitory machine readable storage medium storing one or more sequences of instructions for extending extract, transform, and load (ETL) metadata, wherein the ETL metadata defines and manages ETL processes for a data warehouse, wherein said instructions, when executed by one or more processors, cause the one or more microprocessors to execute the steps comprising:

detecting changes in one or more data objects that are associated with an application data store;

passing the detected changes to an extender associated with the data warehouse;

creating, via the extender, an ETL extension plan that executes on one or more microprocessors including receiving input specifications that define data to be loaded and tables to be extended in the data warehouse, reading an ETL plan template from a metadata service based on the input specifications, generating an initial plan by applying the input specifications to the plan template, refining the initial plan by reading from the data warehouse an additional metadata that defines the data warehouse and including one or more ETL plan elements specifying modifications to be made to the data warehouse to accommodate the detected changes in the data objects, and checking consistency and resolving dependencies among the one or more plan elements in the refined plan to generate a final plan;

organizing the one or more ETL plan elements in the final plan into an order which denotes a sequence in which the plan elements are to be executed in the data warehouse; and performing an ETL metadata extension based on the ETL extension plan to extend the data warehouse.

12. The non-transitory machine readable storage medium according to claim 11, wherein:

each said ETL plan element is an abstract element that is implemented to work with a particular warehouse.

13. The non-transitory machine readable storage medium according to claim 11, wherein the plan template contains one or more plan elements that has a creation mode.

14. The non-transitory machine readable storage medium according to claim 11, further comprising:

deleting the ETL extension plan.

15. The non-transitory machine readable storage medium according to claim 11, further comprising:

processing the one or more ETL plan elements differently for a different underlying data warehouse, wherein the one or more plan elements are independent from any particular data warehouse.

16. The non-transitory machine readable storage medium according to claim 11, further comprising:

converting each said plan element into a detailed set of internal extension metadata for a particular data warehouse.

17. The non-transitory machine readable storage medium according to claim 11, further comprising:

reading in one or more specific templates for a particular data warehouse, wherein the particular data warehouse is associated with the ETL metadata; and making incremental changes to the ETL metadata.

18. The non-transitory machine readable storage medium according to claim 11, further comprising:

representing extension metadata in XML document that is shipped to an end user's site.

* * * * *

UNITED STATES PATENT AND TRADEMARK OFFICE
CERTIFICATE OF CORRECTION

PATENT NO. : 8,433,673 B2  
APPLICATION NO. : 13/100249  
DATED : April 30, 2013  
INVENTOR(S) : Venkatasubramanian et al.

Page 1 of 1

It is certified that error appears in the above-identified patent and that said Letters Patent is hereby corrected as shown below:

In the Drawings:

On Drawing sheet 2 of 8, in figure 2, Reference Numeral 201, line 3, delete "souce" and insert -- source --, therefor.

On Drawing sheet 2 of 8, in figure 2, Reference Numeral 208, line 2, delete "phisical" and insert -- physical --, therefor.

On Drawing sheet 3 of 8, in figure 3, Reference Numeral 301, line 1, delete "recieves" and insert -- receives --, therefor.

In the Specifications:

In column 5, line 44, delete "an be" and insert -- can be --, therefor.

In column 10, line 60, delete "base don" and insert -- based on --, therefor.

Signed and Sealed this  
Twenty-seventh Day of August, 2013

Teresa Stanek Rea  
*Acting Director of the United States Patent and Trademark Office*